Nov. 10, 1959     H. HARRIS     2,912,550

WELDING METHODS AND APPARATUS

Filed March 12, 1957     3 Sheets-Sheet 1

INVENTOR.
Herbert Harris
BY
ATTORNEY

Nov. 10, 1959     H. HARRIS     2,912,550
WELDING METHODS AND APPARATUS
Filed March 12, 1957     3 Sheets-Sheet 2
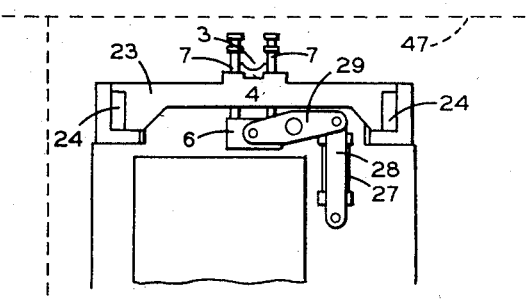
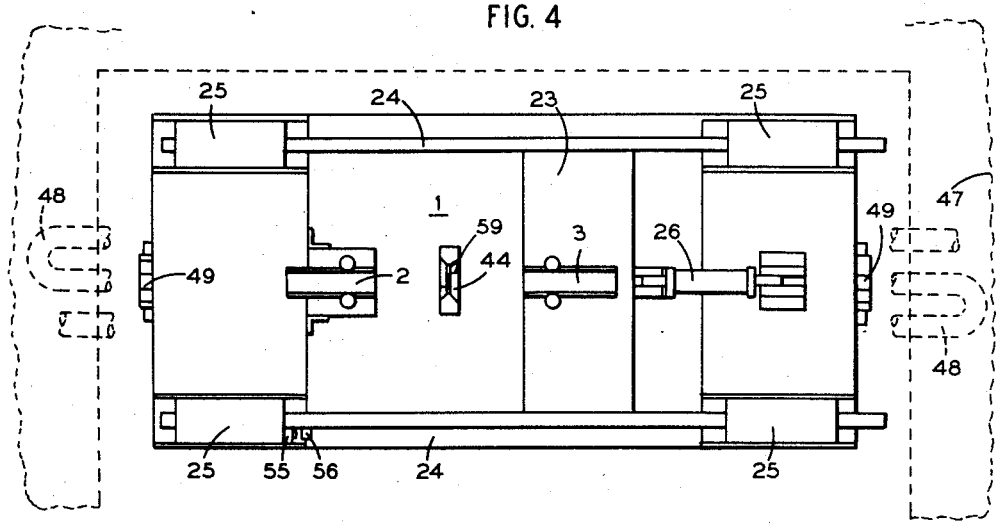
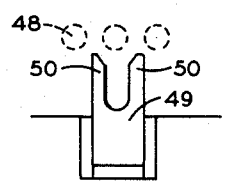
INVENTOR.
Herbert Harris
BY
ATTORNEY Nov. 10, 1959  H. HARRIS  2,912,550
WELDING METHODS AND APPARATUS
Filed March 12, 1957  3 Sheets-Sheet 3
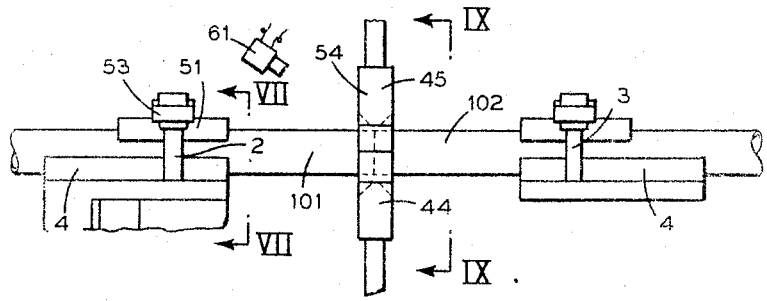
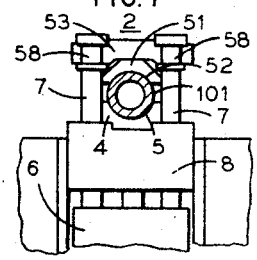
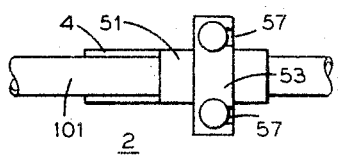
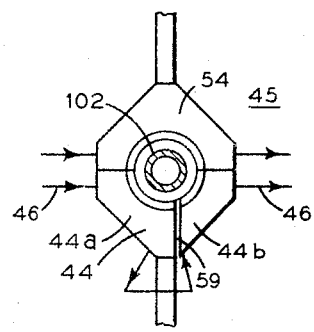
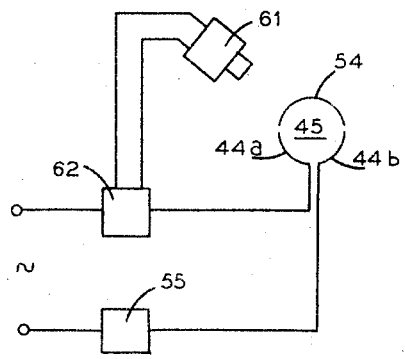
INVENTOR.
Herbert Harris
BY
ATTORNEY

United States Patent Office 2,912,550
Patented Nov. 10, 1959

2,912,550

WELDING METHODS AND APPARATUS

Herbert Harris, Johnstone, Scotland, assignor to The Babcock & Wilcox Company, New York, N.Y.

Application March 12, 1957, Serial No. 645,502

4 Claims. (Cl. 219—9.5)

This invention relates to an improved method of welding and an improved machine for uniting metallic tubular members by welding. More particularly the invention is concerned with the welding together of ferritic or austenitic steel tubular members. A common method of welding together tubes to form a tube panel or platen for constituting a heat exchange element of a steam superheater or the like is by flash welding. Whilst sound welds may be produced in this way, the method suffers from certain drawbacks. Thus, during the flash welding process, an internal annular flash or fin of irregular dimensions may be produced at the weld, the removal of which creates difficulties in manufacture. The completion of a weld requires a pressure at the junction of the workpieces to be united of between 2 and 5 tons per square inch so that very firm clamping of the workpieces is required commonly involving C-arms of heavy cross-section each having a limb extending above the welding table. When building up a tube panel or platen the obstruction offered by the C-arms is inconvenient.

I have found that excellent welds may be produced by pressure welding using induction heating with pressures very much less than those used for flash welding. This method has the advantage that no inconvenient amount of internal flash is produced. Also no variation of pressure is necessary. Moreover, thanks to the reduced pressure, the provision of adequate tube holding means without recourse to C-arms is facilitated so that the manufacture of platens or panels is greatly facilitated.

The present invention includes the method of uniting steel tubular members which includes raising the metal temperature at the ends of the members by induction heating to a suitable welding temperature and maintaining the said temperature substantially constant until the union of the members has been effected and pressing together the members with their ends in register at a pressure at least of 0.15 ton per square inch but little if at all greater than one ton per square inch.

Advantageously the members are pressed together with a force which is maintained substantially constant.

When each member is of mild or low alloy steel there is suitably used a pressure within the range of 0.15 to 0.85 ton per square inch with a corresponding temperature range of 1460° C. to 1380° C., as determined by an optical pyrometer, the temperature chosen being the lower the higher the pressure used.

When each tubular member is of austenitic steel there is suitably used a pressure within the range of 0.15 to 0.55 ton per square inch with a corresponding temperature range of 1420° C. to 1340° C. as determined by an optical pyrometer.

The pressure range in each case is such that the lowest pressure is sufficient to produce effective molecular interpenetration at the abutting faces of the tubular members, whilst at the highest pressure failure to obtain satisfactory fusion through upsetting of the metal at too low a temperature is avoided.

The members when of ferritic material may be held by magnetic attraction exercised by electromagnetic means. In this manner very rapid clamping and release of the members may be effected. The means adapted to exert a clamping action on a tubular member may include an electromagnet arranged to pull the member magnetically against a seating in a block or jaw; the block or jaw may include spaced pole pieces of the electromagnet arranged to be magnetically bridged by a portion of the tubular member.

Alternatively, suitably each member is clamped between two parts or jaws and one part is drawn towards the second part by means acting in tension on the side of the second part remote from the first part.

The invention also includes a machine for uniting tubular members by welding having relatively movable clamping means adapted to position the tubular members during the welding operation and means for pressing together and means for inductively heating the ends of the tubular members held by the clamping means, whereing each clamping means includes a block or jaw formed with a tube seating and means adapted to exert a clamping action on a tube by pulling the tube against the seating.

Suitably the inductive heating means comprises a coil formed in two halves to facilitate removal of the tubular members after the welding operation and suitably the coil is supplied with electric current at a frequency of 10,000 cycles. In some instances a relatively high frequency may be preferred and in welding together thick walled pipes an internal coil as well as an external coil may be employed.

The invention will now be described, by way of example, with reference to the accompanying diagrammatic drawings, in which:

Figure 3 is a side elevation of part of the machine in section on the line III—III of Figure 1;

Figure 4 is a plan view of the machine;

Figure 5 is a side elevation of a locator, hereinafter referred to;

Figure 6 is a front elevation of the uppermost parts of the machine with the said detachable parts in place and with two tube lengths clamped for a welding operation;

Figure 7 is a side elevation in section on the line VII—VII of Figure 6;

Figure 8 is a plan view of the parts shown in Figure 7;

Figure 9 is a side elevation in section on the line IX–IX of Figure 6; and

Figure 1:
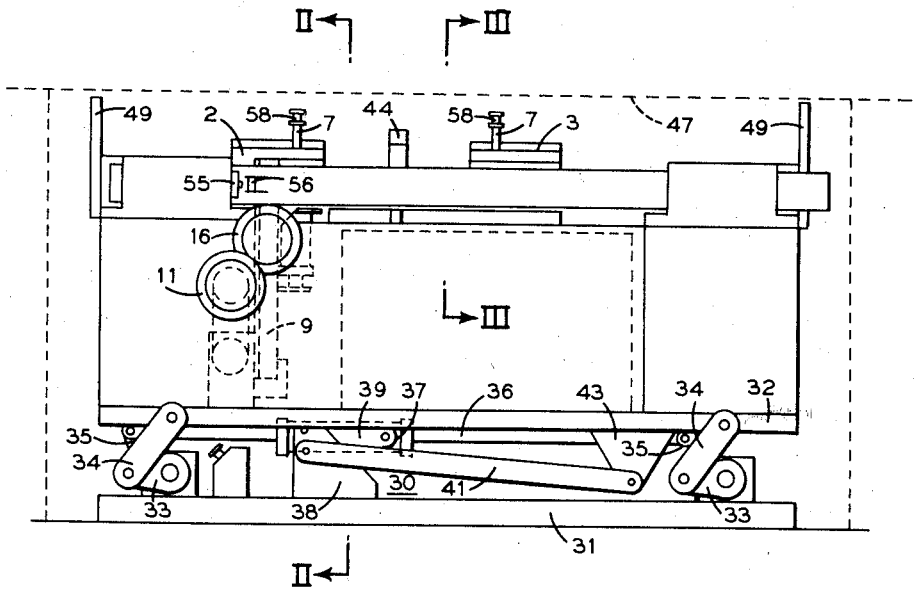
Figure 1 is a front elevation of a welding machine with certain detachable parts removed.
Figure 2:
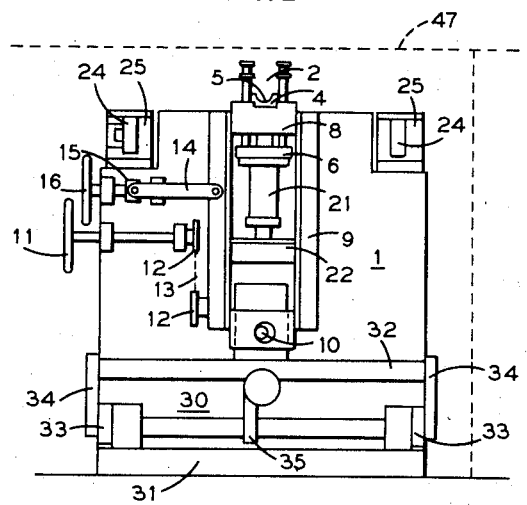
Figure 2 is a side elevation in section on the line II—II of Figure 1.

Figure 10 indicates the electric circuits involved.

Referring to the drawings, a machine 1 for uniting tubes end to end by pressure welding using induction heating provides relatively movable clamping means 2 and 3 adapted to position the tubes during the welding operation. By means which will be indicated, the clamping means 2 is adjustable to a certain extent vertically in relation to the major part of the rest of the welding machine and also to a certain extent in forward and rearward directions, which is to say, transversely of the longitudinal axis of the machine. The clamping means 3 is movable longitudinally of the axis of the machine under the influence of hydraulic upset means to be indicated.

Each clamping means includes a block or jaw 4 formed in its upper surface with a tube seating 5, and a forked member 6 having limbs 7 respectively extending upwardly on opposite sides of the block 4. The block 4 of the claming means 2 is mounted on a support member 8 secured to a vertically extending frame 9 which is mounted in the machine so as to have a certain degree of freedom limited to a plane transverse to the longitudinal axis of the machine. The lower end of the frame 9 is mounted on an eccentric 10 of which the axis is parallel to the machine longitudinal axis and which is capable of being rotated by a handwheel 11 on the front of the machine operating through sprockets 12, a chain 13 and worm and wormwheel gear. By means of said handwheel the frame 9 may be raised or lowered to an adjustable extent within limits. By means of a link 14, pivoted at its one end on the frame 9, extending transversely of the machine longitudinal axis in a horizontal or substantially horizontal direction and pivoted at its other end on nut and screw mechanism 15 operated by a second handwheel 16, the frame 9 may be rotated about the eccentric 10 whereby the upper end of the frame 9 including the support member 8 may be moved transversely of the machine longitudinal axis within limits.

The limbs 7 of the forked member 6 of the clamping means 2 make sliding fits in vertical channels in the support member 8. The forked member 6 is operatively connected to piston and cylinder hydraulic means 21 associated with a cross-piece 22 on the frame 9.

The block 4 of the clamping means 3 is mounted upon a supporting bridge 23 extending transversely of the machine longitudinal axis between a pair of longitudinally extending guide members 24, to which it is secured, respectively at the front and at the rear of the machine. Each of the guide members 24 runs at each of its ends in a roller bearing 25. The supporting bridge 23 together with the guide members 24 are arranged for longitudinal movement under the influence of piston and cylinder hydraulic upset means 26 associated with a fixed part of the machine.

The limbs 7 of the forked member 6 of the clamping means 3 are arranged to make sliding fits in vertical channels in the supporting bridge 23. The forked member 6 of the clamping means 3 is movable vertically with respect to the supporting bridge 23 by the operation of piston and cylinder hydraulic means 27 associated with the supporting bridge 23 and operatively connected to the forked member through a link 28 and a lever 29 pivoted at its centre on the bridge.

The various parts of the machine so far mentioned are movable together by the substantially vertical movement of the upper part of the machine to provide which movement lifting gear 30 is provided between a fixed horizontal base plate 31 and a platform 32 for the upper part of the machine. The said lifting gear comprises at each end of the machine a pair of cranks 33 connected to the platform 32 by links 34. The cranks 33 are turnable by further cranks 35 constituting with a connecting link 36 a parallel motion ensuring that the platform 32 remains horizontal; the connecting link 36 of the parallel motion constiutes also the piston rod of piston and cylinder hydraulic means 37 adapted to provide the force for lifting the machine upper part. The hydraulic means 37 is associated with a bracket 38 on the base plate 31 through a link 39. A drag link 41 pivoted at its one end on the bracket 38 on base plate 31 and at its other end on a bracket 43 on the platform 32 ensures that the machine upper part moves, while being lifted, in an arcuate path which is a sufficient approximation to a vertical path.

On the machine upper part there is also mounted, with the possibilities of adjustment vertically, transversely to the machine axis and longitudinally of the tube axis, the lower half 44 of an induction heater ring 45 this ring half being arranged between the clamping means 2 and 3 and with its axis in line with the tube seating 5 in the block 4 of the clamping means 3. Said ring half consists of a hollow copper Y-piece, in two sections 44a and 44b separated by insulation 59, which is arranged to be cooled by water led to and from the interior through pipes indicated at 46.

When the machine upper part is in a lowered position, no member extends therefrom above the level of a worktable, of which the level of the upper surface is indicated at 47, which surrounds the welding machine 1 except at the front of the latter and on which worktable surface a tube platen or panel and tube lengths to be joined thereto may be manipulated.

By operation of the lifting gear 30 to raise the machine upper part the tube seatings 5 in the block 4 may be brought up to the level of the worktable surface so as to engage parts of tube lengths 48 lying thereon, the limbs 7 of each forked member 6 rising at the two sides of the tube length to be engaged. Proper location of the tube lengths with respect to the welding machine is assisted by two forked locators 49 secured one to one end the other to the other end of the machine upper part, the upper ends of the limbs 50 of the locators being shaped to urge into appropriate positions, as the machine upper part rises, tube lengths which are to be operated upon.

When it is desired to clamp a tube length in a clamping means, the clamping means is completed by placing upon the top surface of the part of the tube length lying in the appropriate tube seating 5 in the upper surface of a block 4 an upper block 51 formed in its lower surface with a tube seating 52 and inserting a cross-piece 53 in engagement with the upper ends of the limbs 7 of the appropriate forked member 6. The crosspiece 53 is formed with slots 57 whereby the ends of the cross-piece may be engaged in annular grooves 58 in the upper parts of the limbs 7. By means of the cross-piece downward pressure may be applied to the tube length through the upper block 51 to exert a clamping action on the tube by pulling the tube length against the seating 5, when pressure fluid is applied to the appropriate side of the piston in the hydraulic means 21 or 27.

The induction heater ring 45 is completable by lowering onto the lower ring half 44 an upper ring half 54 of similar construction to the lower ring half 44 (but not consisting of two sections) and supported from any suitable overhead means.

To one of the roller bearings 25 at the front of the machine there is attached an electric switch 55 adapted to be operated in the circuit-breaking sense by an abutment 56 secured at any desired position within limits on the corresponding guide member 24, the arrangement being such that the abutment acts to operate the switch in the case of a predetermined movement of the guide member in a direction corresponding to movement of the supporting bridge 23 with the clamping means 3 towards the clamping means 2. The said switch is connected in the circuit of the induction heater, as indicated in Figure 10.

Also supported from any suitable overhead means is a radiation pyrometer 61 of which the line of sight is directed towards the tube surfaces within the induction heater ring. The circuit of the pyrometer is arranged to operate suitable relays 62 so that when the observed metal surface temperature of the tube rises above a predetermined value the circuit of the induction heater will be automatically interrupted and when the said temperature falls below that value the circuit of the induction heater will be automatically reclosed.

In operating the machine to unite end to end two mild steel tube lengths, generally, more especially in the formation of a tube platen or panel, the tube lengths, denoted by 101 and 102, say, with the end surfaces thereof accurately prepared, will first be placed end to end upon the worktable surfaces, after which the upper part of the machine 1 will be raised by operation of the hydraulic lifting gear 30 until the tube seatings 5 in the blocks 4 of the clamping means 2 and 3 appropriately engage the respective tube lengths. Normally the two tube seatings 5 of the blocks 4 of the clamping means 2 and 3 will be exactly in line; however, there may be need to provide for a slight offset between the axis of the parts of the tube lengths within the seatings 5, to cater for slight departure from uniformity in the tubes, and if such be the case, the desired offset may be set up in the machine by operating the handwheels 11 or/and 16.

With the adjacent ends of the two tube lengths in contact at the central plane of the lower ring half 44 of the induction heater 45, each of the clamping means 2 and 3 is completed by placing over the part of the tube length lying in the tube seating 5 an upper block 51, engaging with the limbs 7 of the forked member 8 a cross-piece 53 and operating the appropriate hydraulic means 21 or 27 to exert an adequate clamping action on the tube length by pulling the tube length against the tube seat 5. The abutment 56 is adjusted in position on the appropriate guide member 24 a suitable predetermined distance from the switch 55 corresponding to the desired amount of upset of the tube ends, and pressure fluid is applied to the hydraulic upset means 26 to press the ends of the two tube lengths together with a suitable constant pressure in the range 0.15 to 0.85 ton per square inch.

With the induction heater ring half 44 positioned concentric with the tube axes and with alternating electric power of very high frequency connected between the two sections 44a and 44b of the induction heater ring half 44 the upper ring half 54 is lowered to contact the lower ring half 44 whereupon the contacting tube ends commence to heat up. The circuit of the radiation pyrometer 61 is arranged to interrupt the induction heater circuit upon the metal temperature, as observed by the radiation pyrometer, rising above a predetermined value in the range 1380° C. to 1460° C. and by controlling the induction heater circuit to regulate to such value the temperature as observed by the radiation pyrometer.

During the welding operation the abutting ends of the two tube lengths are upset; the amount of upset is limited, so that no inconvenient amount of internal flash is produced, by the abutment 56 which operates the switch 55, when a predetermined amount of upset has been attained to terminate the welding operation.

Both the forces required for clamping and the forces required to urge together the ends of the tubes to be welded are relatively low.

The task of fabricating a tube platen or panel is facilitated by the absence above the worktable of any fixed or difficultly movable component of the welding machine and is not conditioned by considerations arising from the necessity of removal of flashes within the completed tube platen or panel.

What I claim is:

1. The method of uniting steel tubular members which includes raising the metal temperature at the ends of the members by induction heating to a suitable welding temperature and maintaining the said temperature substantially constant until the union of the members has been effected and pressing together the members with their ends in register at a pressure at least of 0.15 ton per square inch but not exceeding one ton per square inch.

2. The method claimed in claim 1, in which the members are pressed together with a force which is maintained substantially constant.

3. The method claimed in claim 2, in which each member is of mild or low alloy steel and the pressure is within the range of 0.05 to 0.85 ton per square inch with a corresponding temperature range of 1460° C. to 1380° C. the temperature being the lower the higher the pressure used.

4. The method claimed in claim 2, in which each member is of austenitic steel and the pressure is within the range of 0.15 to 0.55 ton per square inch with a corresponding temperature range of 1420° C. to 1340° C.

References Cited in the file of this patent

UNITED STATES PATENTS

| 1,435,996 | Taylor | Nov. 21, 1922 |
| 1,902,955 | Holmes | Mar. 28, 1933 |
| 2,018,379 | Pfeiffer | Oct. 22, 1935 |
| 2,018,380 | Pfeiffer | Oct. 22, 1935 |
| 2,099,622 | Printz | Nov. 16, 1937 |
| 2,213,136 | Gladitz | Aug. 27, 1940 |
| 2,233,617 | Lamb | Mar. 4, 1941 |
| 2,439,246 | Gibian | Apr. 6, 1948 |
| 2,730,599 | Ronay | Jan. 10, 1956 |
| 2,737,566 | Wuppermann | Mar. 6, 1956 |

FOREIGN PATENTS

| 171,347 | Great Britain | Jan. 20, 1921 |